(No Model.) 7 Sheets—Sheet 1.
W. KOCH.
CASH RECORDER.
No. 431,661. Patented July 8, 1890.
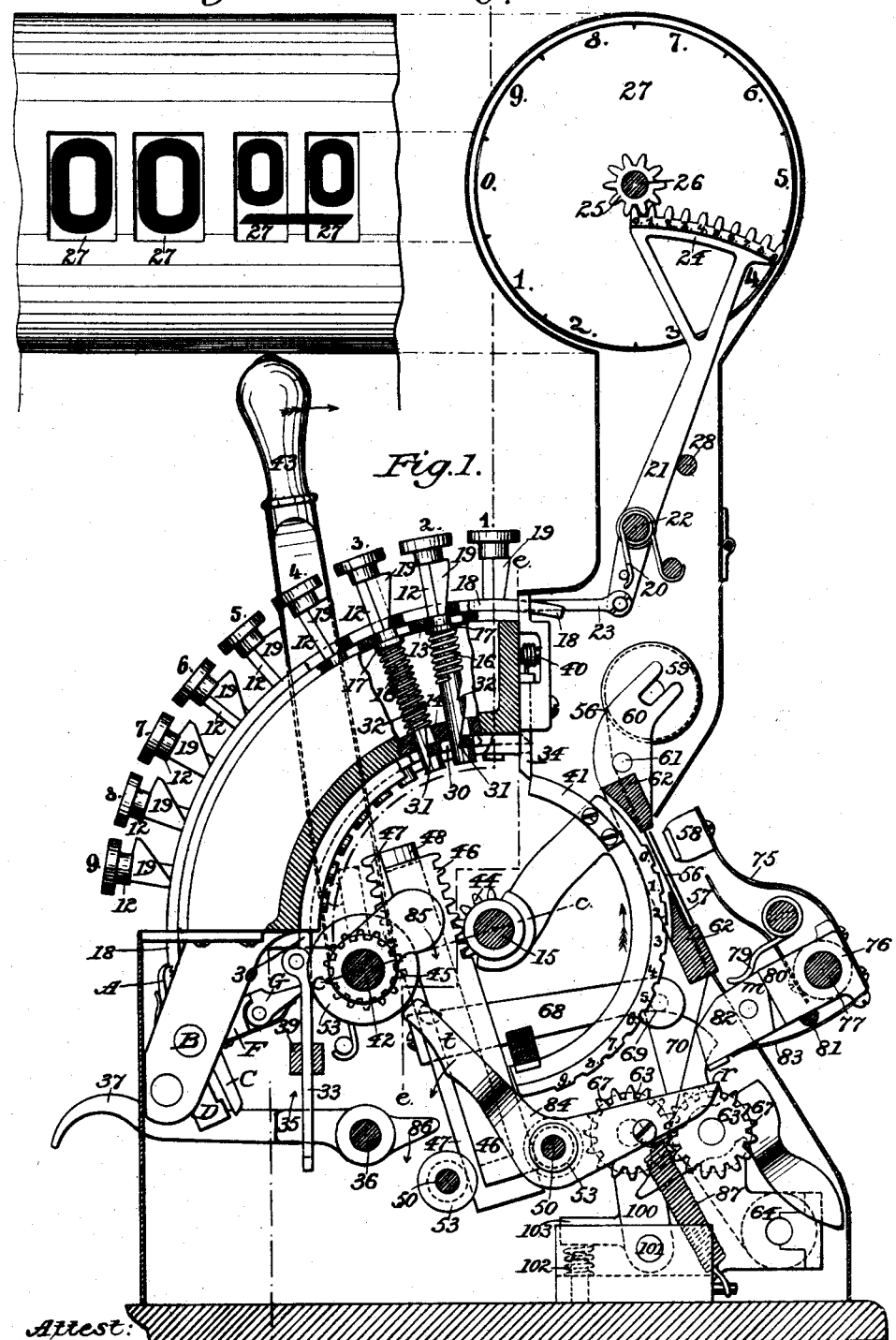
Attest:
A. H. Jackson
E. H. Watson
Inventor:
William Koch
By David A. Newsom Atty (No Model.) 7 Sheets—Sheet 2.

W. KOCH.
CASH RECORDER.

No. 431,661. Patented July 8, 1890.

Attest:
A. N. Jesbera
E. M. Watson

Inventor:
William Koch
By David A. Burr
Atty.

(No Model.) 7 Sheets—Sheet 3.
W. KOCH.
CASH RECORDER.
No. 431,661. Patented July 8, 1890.
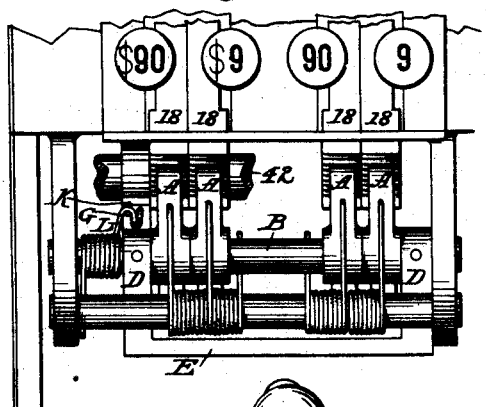
Fig. 6.
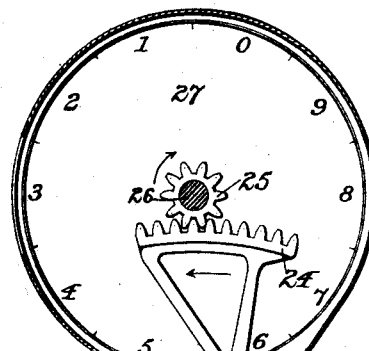
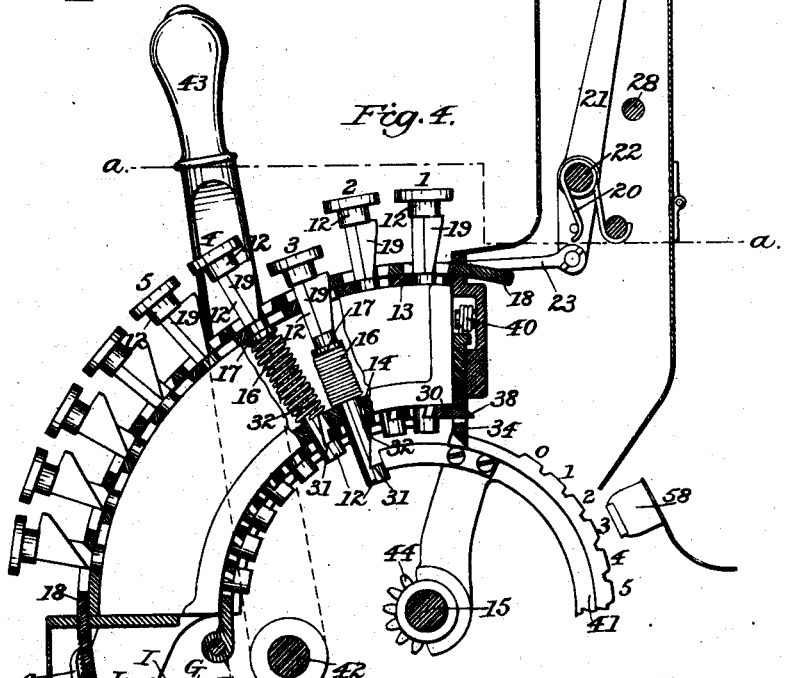
Fig. 4.
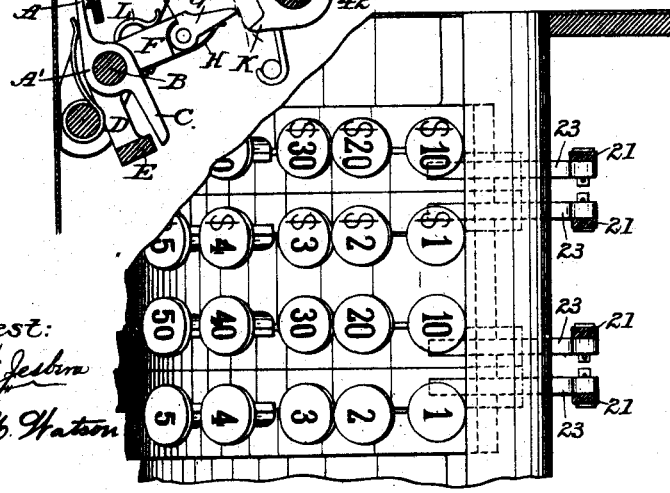
Fig. 5.
Attest:
A. N. Jesbera
C. M. Watson
Inventor:
William Koch
By David A. Burr
Atty.

(No Model.)  7 Sheets—Sheet 4.
W. KOCH.
CASH RECORDER.
No. 431,661.  Patented July 8, 1890.
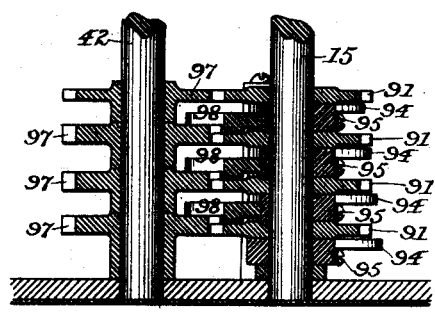
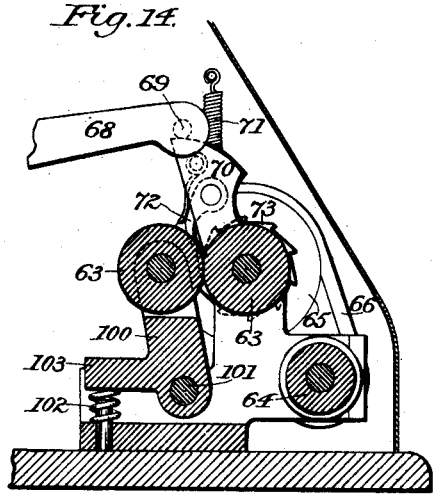
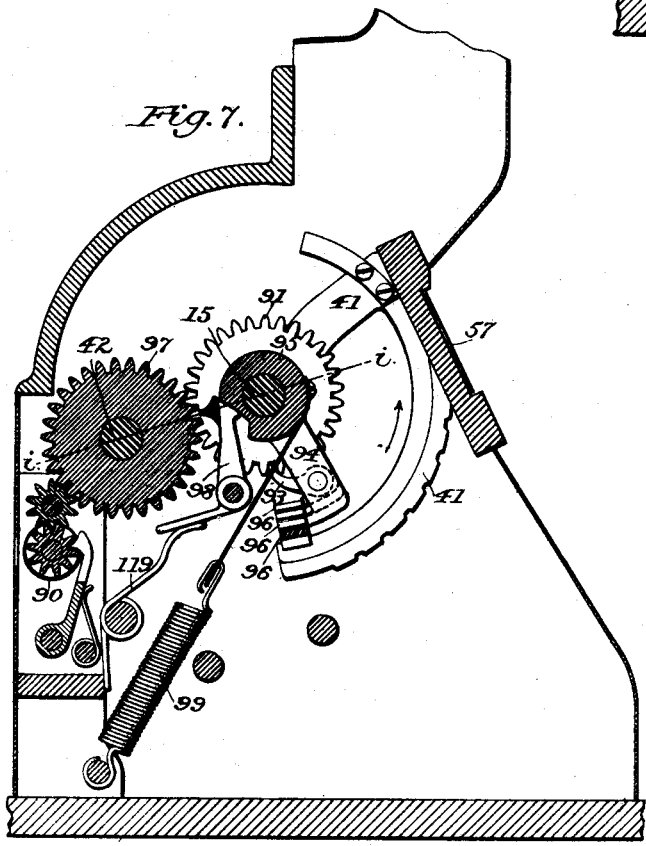
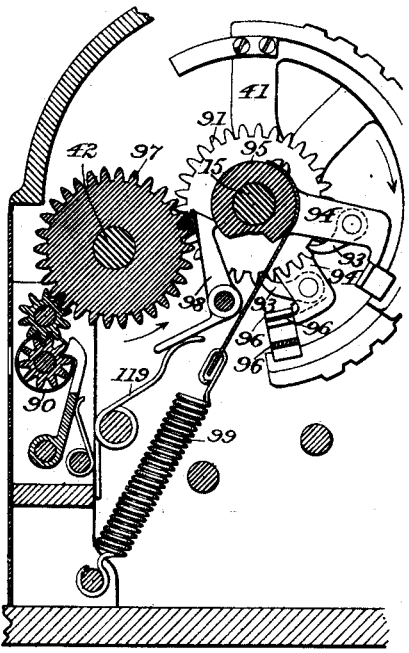
Attest:
A. N. Jesbera
E. H. Watson
Inventor:
William Koch
By David Axburt Atty.

(No Model.) 7 Sheets—Sheet 5.

W. KOCH.
CASH RECORDER.

No. 431,661. Patented July 8, 1890.

Attest:
A. N. Jesbera
E. M. Watton

Inventor:
William Koch
By David A. Burr
Atty.

(No Model.) 7 Sheets—Sheet 6.

W. KOCH.
CASH RECORDER.

No. 431,661. Patented July 8, 1890.

Attest:
A. N. Jesbera
E. M. Watson

Inventor
William Koch
By David A. Burr Atty (No Model.) 7 Sheets—Sheet 7.
W. KOCH.
CASH RECORDER.
No. 431,661. Patented July 8, 1890.
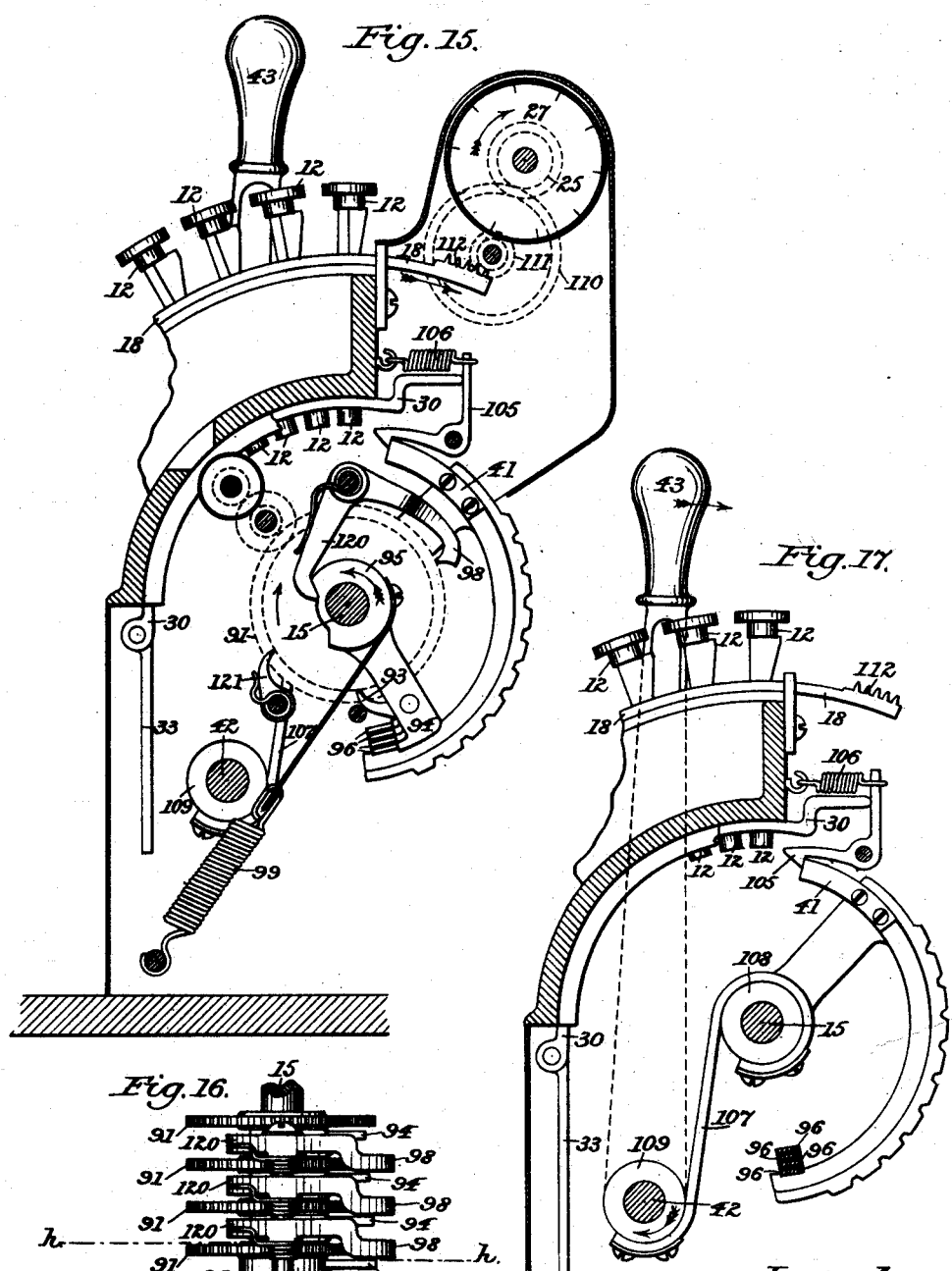
Attest:
A. A. Jesbera
O. H. Watson.
Inventor:
William Koch
By David A. Burr
Atty.

UNITED STATES PATENT OFFICE.

WILLIAM KOCH, OF NEW YORK, N. Y., ASSIGNOR TO THE KRUSE CHECK AND ADDING MACHINE COMPANY, OF NEW YORK.

CASH-RECORDER.

SPECIFICATION forming part of Letters Patent No. 431,661, dated July 8, 1890.

Application filed September 3, 1888. Serial No. 284,450. (No model.)

*To all whom it may concern:*

Be it known that I, WILLIAM KOCH, of the city, county, and State of New York, have invented certain new and useful Improvements in Cash Recording, Indicating, and Adding Machines; and I do hereby declare that the following is a full and exact description thereof, reference being had to the accompanying drawings, and to the letters and figures of reference marked thereon, making a part of this specification.

My invention relates to improvements in the construction of machines for recording and indicating successive cash payments from one cent upward and for adding up and registering the total amount of the payments so indicated and recorded.

It consists in the novel construction, combination, and arrangement of the several parts coacting in the machine, as hereinafter described and claimed.

Figure 3:
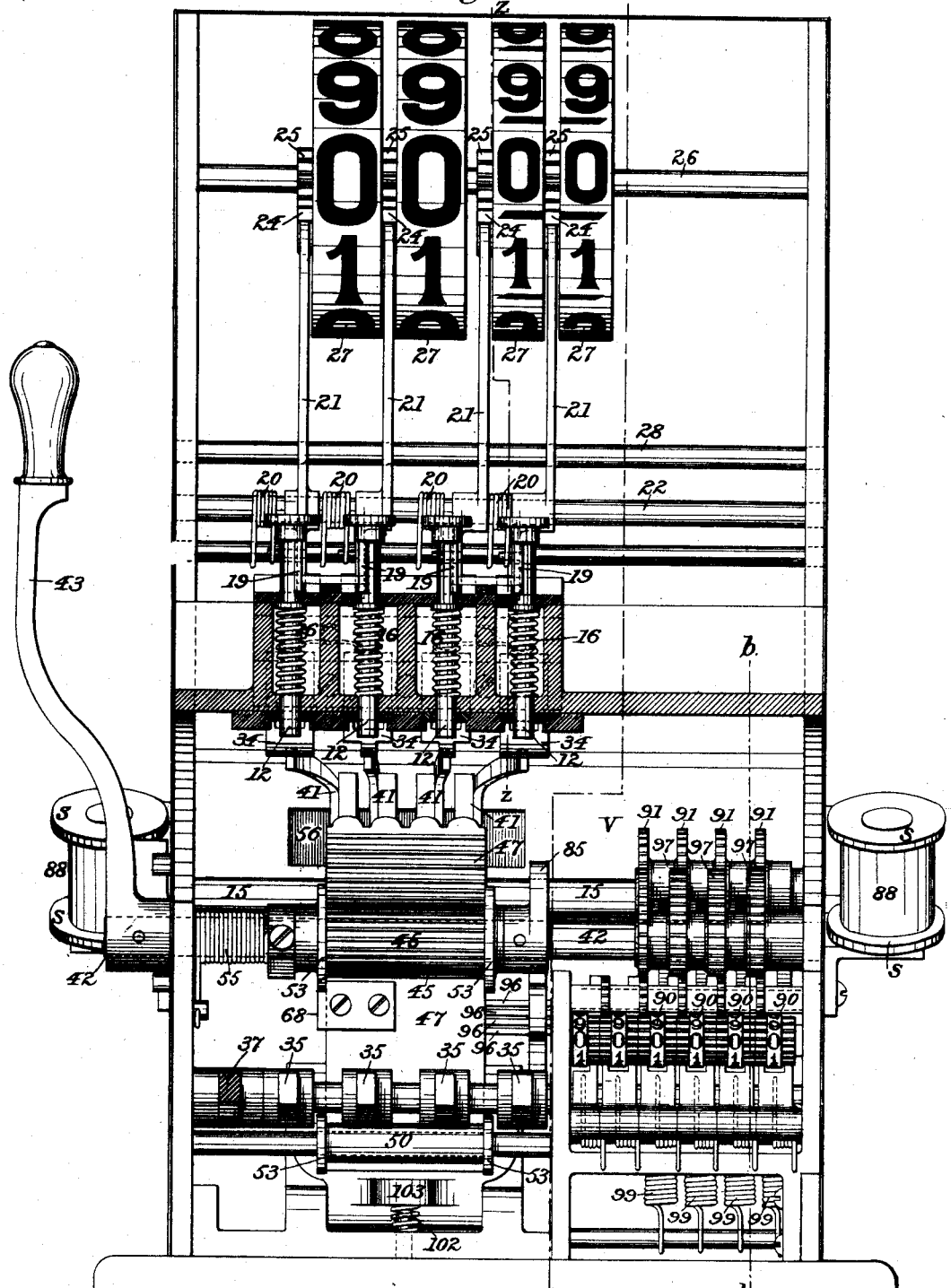
Figure 10:
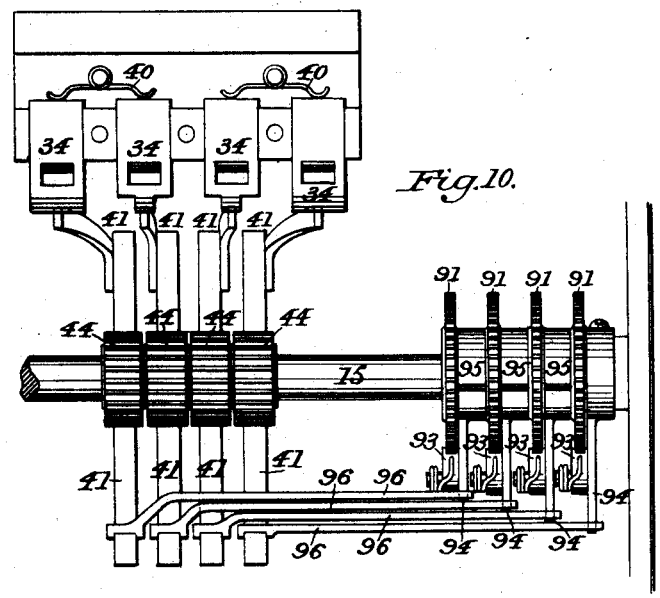
Figures 11, 12:
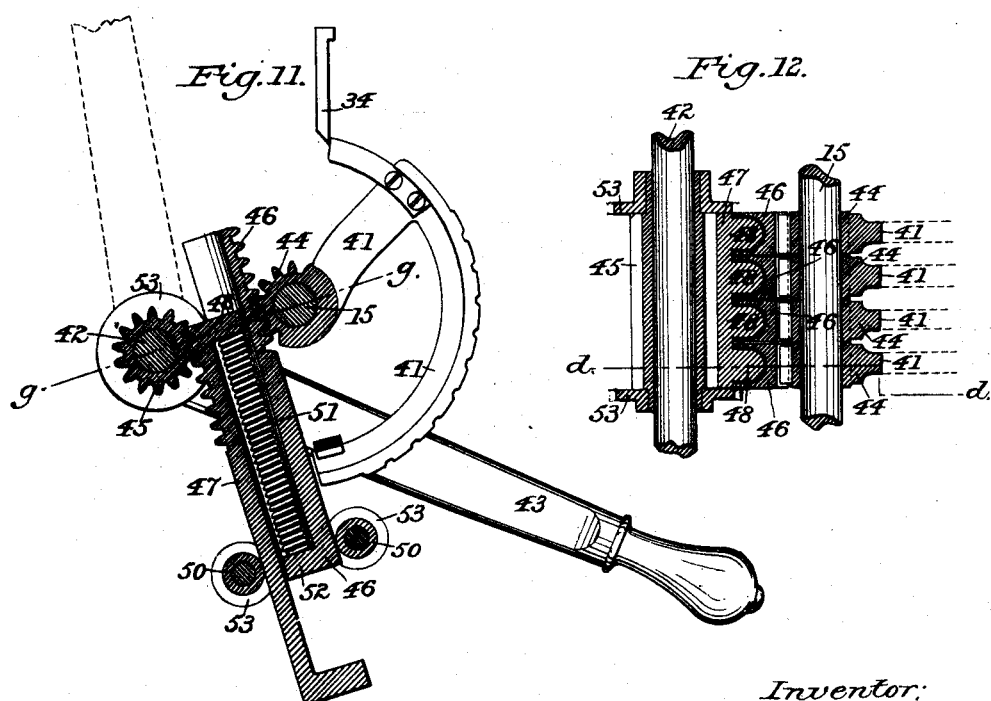
Figure 13:
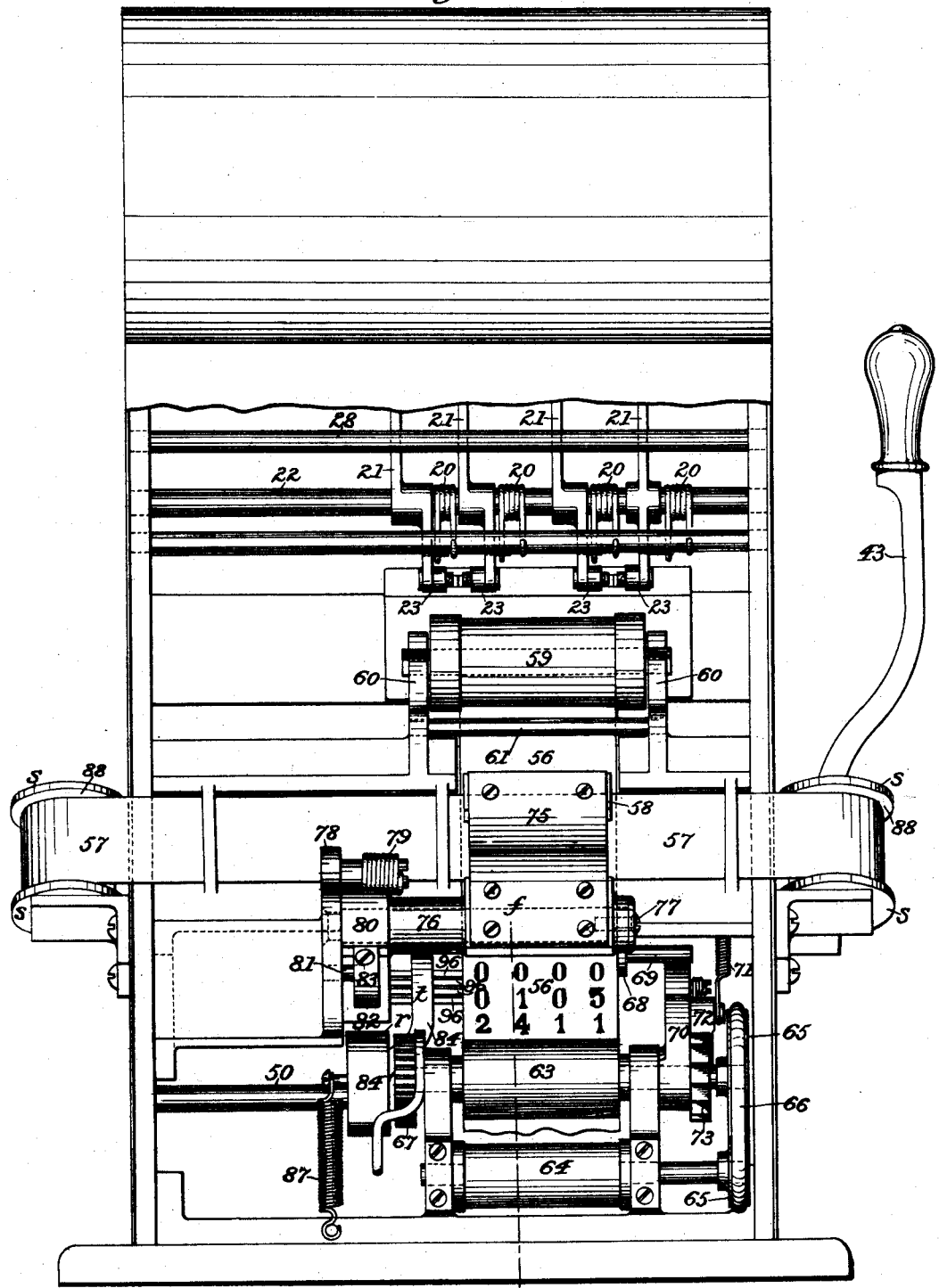

In the accompanying drawings, Figure 1 is a vertical transverse section of the machine in line $x\ x$ of Fig. 3 looking to the left and affording a side elevation of its working parts other than the adding mechanism, a portion of the lower guide-bar for the keys and of the key locking-bar being broken away; Fig. 2, a detached view of a portion of the front of the casing, illustrating the openings through which the indicating-wheels are brought to view. Fig. 3 is an irregular vertical section in line $y\ y$ of Fig. 1, affording a front view of the principal working parts of the machine, the devices for moving the locking-bar to liberate the keys and for locking said bar being omitted; Fig. 4, a vertical section in line $z\ z$ of Fig. 3, looking to the left, with some of the minor parts omitted, illustrating the operation of the stop-plates which arrest the type-wheels and of the indicating-wheels and their connections with the keys. Fig. 5 is a detailed horizontal section in line $a\ a$ of Fig. 4, illustrating more particularly the top of the key portion of the case. Fig. 6 is a detailed front elevation of the machine immediately below the key-board with the front plate removed, illustrating the devices for holding each key and indicating-wheel until the next is played. Fig. 7 is a vertical transverse section in line $b\ b$ of Fig. 3 looking to the left and illustrating the movements for the adding mechanism, and Fig. 8 a similar section showing a change in position of the parts; Fig. 9, a cross-section in line $i\ i$ of Fig. 7; Fig. 10, a vertical section in line $e\ e$ of Fig. 1, looking to the right, thereby omitting from the view the adding-wheels and the slotted wheels gearing them with the pawl-actuated spur-wheels, but illustrating more fully the connection of the type-bars with the adding mechanism; Fig. 11, a cross-section in line $d\ d$ of Fig. 12, illustrating the compound connecting-bars and racks interposed, the handle, and the type-bars with the handle in its extreme depressed position; Fig. 12, a cross-section through the same parts in line $g\ g$ of Fig. 11 and $c\ c$ of Fig. 1; Fig. 13, a rear elevation of the machine with the lower portion of the casing broken away; Fig. 14, a vertical section in line $f\ f$ of Fig. 13, illustrating the movements of the feed mechanism. Fig. 15 is a transverse sectional view in a vertical plane similar to Fig. 7 and in line $h\ h$ of Fig. 16, illustrating modifications in the movements of the adding mechanism and of the indicating mechanism. Fig. 16 is a plan view of the series of master-wheels actuating the adding-wheels and of the dogs controlling said master-wheels, the adding-wheels being omitted in said view. Fig. 17 is a vertical section similar to Fig. 15, illustrating modifications in the device for gearing the type-carriers to the actuating rock-shaft, and also in the stop device locking the type-carrier in its first or normal position.

Similar numbers and letters indicate like parts in all of the figures.

The frame and case for the machine is of suitable form to support and inclose its working parts.

The stops by which the movements of the indicating, printing, and adding mechanism are governed, and which will be hereinafter designated as "keys," are arranged in rows at the front of the machine to radiate from a horizontal axis in parallel vertical planes, the keys denoting cents from 1 to 9 being in the first row, (see Fig. 5,) those denoting cents from 10 to 90 in the second row, and these denoting dollars from 1 to 9 and from 10 to 90 in the next two rows. Each stop or key consists of a pin or rod 12, playing longitudinally through suitable apertures in two concentric segmental guide-plates 13 and 14, (see Figs. 1 and 4,) supported by the frame of the machine and curved each upon an arc having the axis of the fixed horizontal shaft 15 as a center. These keys are each encircled by a spiral spring 16, interposed between the plates 13 and 14 to carry and support the key normally in an outward position, determined by a collar 17, encircling the key under the upper plate 13. A series of curved plates 18 18 18— one for each row of keys—are fitted to slide freely longitudinally upon the upper guide-plate 13. Each of these sliding plates 18, to be hereinafter designated as "indicator-plates," is notched upon one edge or is longitudinally slotted with an elongated notch or slot to receive and embrace more or less fully the stems of the row of keys adjoining it.

The keys 12 12 are severally fitted with thin lateral wedge-shaped plates 19 19, whose faces are parallel with the length of said indicator-plates 18 and whose outer edges are so inclined that the plates widen from their lower ends upwardly, as shown in Figs. 1 and 4. When the keys are in their normal positions, they severally project out beyond the indicator-plates 18 18, each with the lower narrow end of its wedge-plate 19 in contact with the rear end or wall of the notch or slot in the indicator-plate through which the stem of the key passes, and the indicator-plate is automatically held in this position by means of a spring, as hereinafter described. Hence by pushing in either key in a row the indicator-plate 18 appropriate to said row will be moved longitudinally over the underlying fixed guide-plate 13 by means of the inclined face of the wedge-plate 19 on the key, as illustrated in Fig. 4, thereby compressing a spring 20, which, when the key moves outward, will operate to carry the indicator-plate back to its first position.

The actuating-spring for each indicator-plate 18 may be fitted to bear directly upon said plate; but it is preferably fitted, as at 20, to bear against the lower shorter end or arm of a vertically-swinging indicating-lever 21, pivoted upon a horizontal shaft 22 at the rear of the keys, and whose longer arm extends upwardly in the case, as shown in Figs. 1 and 4. The lower shorter end of this indicating-lever is coupled to the rear end of the indicator-plate 18 by a link 23, and its upper end terminates in a segmental rack 24, which gears with a pinion 25, turning loosely upon a horizontal shaft 26 and attached as a hub to a large indicating drum or wheel 27, whose periphery is divided into as many sections plus one as there are keys in the row by which the indicator-plate coupled to its lever is actuated. The extra section on the indicating-wheel is designated by a cipher marked thereon, and the remaining sections by figures corresponding in order with those upon the several keys in the row. The several parts described are so adjusted as that when the keys are all normally at rest the cipher upon the periphery of the indicating-wheel 27 will be brought to sight at an opening in the front of the case, as shown in Figs. 1 and 2, the rearward movement of the segment-lever 21, under the stress of the spring 20, being arrested at this point by a stop 28. (See Fig. 1.)

The wedge-plates 19, fitted to the keys 12 in each row, are made of differential widths, the several plates being made to widen progressively and uniformly in each row from the first or upper key 1 to the last or lowest key 9. By reason of this difference in the width of the several wedge-plates on the several keys, each key, when depressed, will operate to move the indicator-plate a greater distance than will the key next above it, (representing the next lower denomination,) and this difference in movement of the indicator-plate as produced by any two adjacent keys is uniform and is represented by the interval between the teeth of the segmental rack operating the indicating-wheel, said interval serving as the unit of movement. The depression of the first key will thus move the segment one tooth or unit, and thereby turn the indicating-wheel from 0 to 1, while the depression of the last key will move the segment nine teeth or units and turn the indicating-wheel from 0 to 9. The movement and position of any one key in a row or group is thus constantly indicated by means of the indicating-wheel appropriate to that group.

When it is desired that the indicating-wheels shall remain locked to display the amount of the last payment until the next payment is made, the lower end of each indicator-plate 18 is extended to project into the lower portion of the casing, as shown in Fig. 4, and indented with nine notches to correspond with the nine figures on the indicating-wheel operated by the plate. A spring-actuated dog A, projecting from a hub A', turning loosely upon a rock-shaft B, is fitted to engage with said notches. A second arm or lever C is made to project in an opposite direction from the hub A' of the dog. At each end of the shaft B an arm D is pivoted loosely thereon, and the outer ends of the two arms D D are connected by a cross-bar E, which underlies the free ends of all the levers C C, so as to swing into contact therewith and by pressing against the same swing the dogs A A outward against the stress of the springs, free from the notches. A lever F extends from one of the connected arms D at about a right angle therewith toward a rock-shaft 42, extending across the machine parallel with the shafts 22 and 25 and at a right angle with the plane in which each row or group of keys 12 12 is mounted. This rock-shaft 42 is oscillated at pleasure by a handle 43. A latch G is pivoted upon the end of the lever F to project beyond it and is upheld in a right line therewith by means of a spring H, fitted to bear against its under side, its upward movement under the stress of the spring beyond said right line being prevented by a square shoulder I upon its rear end, which strikes against a counterpart square offset on the lever. A toe K is fitted to project from the rock-shaft in position to strike the under side of the latch at the first movement of the handle 43 from its normal vertical position. As the toe strikes the latch, it will bear the lever F upward, and by swinging the arms D D will cause the cross-bar E to bear against the lower ends of the levers C C, and thereby swing the dogs A A clear from the notches, so as to release the indicator-plates and allow the indicating-wheels 27 to turn back under the stress of their actuating-springs 20 to the zero-point. As the toe K strikes and moves the lever F, it will slip by it, and the lever will, under the stress of a spring L, return to its first or normal position, leaving the pawls A A free to fall back into engagement with the notches on the indicator-plates. When the handle 43 is swung back to its upright or normal position, the toe K will strike upon the upper edge of the latch G, and the latch will yield against the stress of its spring H sufficiently to allow the lever to pass and slip under it.

Instead of mounting the indicating-wheels at an elevation above the body of the machine, as shown in Figs. 1, 3, 4, and 13, I contemplate placing them more nearly on a level with the key-board of the machine, as shown in Fig. 15, in which case the lever 21, carrying a segmental rack 24, is dispensed with, and each indicating-wheel 27 is geared to a spur-wheel 110, (see dotted lines, Fig. 15,) actuated by a pinion 111, gearing with a rack 112, formed upon the inner end of the appropriate sliding indicator-plate 18.

When either key 12 12 in either row is depressed or pushed inward, it is caught and held automatically in its depressed position by means of a second curved plate 30, mounted under the row of keys concentrically with the indicator-plate 18 of said row to slide longitudinally in suitable ways immediately under the lower or inner guide-plate 14 upon an arc having the shaft 15 as a center, as shown in Figs. 1 and 4. These sliding plates 30 30 will hereinafter be designated as "locking-plates." The lower ends of the keys in each row pass through elongated apertures in the locking-plate 30 appropriate to the row, and each key is notched on its inner side to form two offsets 31 32, each at a right angle with the length of the key, and which are separated by an interval equal to the length of the throw or longitudinal play of the key when depressed. The first or outer notch and offset 31 is formed in position to be engaged by the locking-plate when the key is in its outward or normal position, the sliding plate being automatically carried into said notch by its gravity, assisted by the stress of a spring, as hereinafter described. The inner face of this first or outer notch 31 on each key is outwardly inclined or beveled to the edge of the second or inner offset 32, as shown in Figs. 1 and 4, so that whenever a key is depressed or forced inward the contact of said inclined face with the end or wall of the aperture in the locking-plate will operate to slide the plate backward in readiness to enter the second notch and engage the second offset 32, and thereby hold and lock the key in its depressed position. This second notch is not so deep as the first. Hence if a second key in the row or group of keys which pass through the same locking-plate be depressed while any other key in the group is locked by the plate the locked key will be released by reason of the movement imparted to the plate by the depression of said second key, which will necessarily carry it back clear of the inner offset 32 of the first key.

To the lower or outer end of each locking-plate is hinged a pendent bar 33, (see Fig. 1,) and the several pendent bars for the several locking-plates are all steadied and guided in a vertical position by being carried through slots in a horizontal cross-bar 39, fixed in the frame of the machine. The lower end of each pendent bar 33 is slotted to receive an arm 35, projecting radially from a horizontal shaft 36, mounted to oscillate in the frame, and which may be actuated by an arm or lever 37, projecting from one end thereof out through the front casing of the machine, as shown in Fig. 1. The weight of the pendent bars 33 will operate automatically to slide each locking-plate forward, so as to cause it to normally engage the notches on the keys appropriate thereto, and when the pendent bars are in their normal depressed position the upper ends of the slots through which the arms 35 of the rock-shaft 36 project will rest upon said arms. Hence by lifting the outer end of the lever 37 the locking-plates may be pushed inward to release them from the keys and set the latter free if locked.

A number of curved segmental type-bars or type-carriers 41 41—one for each row or group of keys—are mounted to oscillate side by side upon the fixed shaft 15 as a pivotal center, a projection from the end of each of said type-bars being adapted to pass closely under the ends of the entire series of keys in its appropriate row when they are in their normal position. (See Figs. 1 and 3.) The forward movement of either type-bar 41 under its row of keys is, however, prevented when the keys are all in their normal position by the contact of the inner end of the bar with the lower edge of a vertically-sliding stop-plate 34, as shown in Fig. 1, or with the end of the bell-crank lever 105, as shown in Figs. 15 and 17 as an equivalent device.

Where a vertically-moving stop-plate 34 is used for each type-bar, the inner end of the locking-plate 30 for the row of keys appropriate to said type-bar is beveled to form a wedge, as shown at 38 in Fig. 4, adapted to engage a counterpart beveled-edge slot in the stop-plate 34, so that the inward movement of the locking-plate 30 to disengage it from the notches on the keys will lift the stop-plate out of its engagement with the end of the type-bar. A spring 40 is fitted to bear upon the upper end of each of the stop-plates 34 to operate with a constant tension to bear it downward and thereby force the locking-plate which it engages outward. By substituting a bell-crank lever 105 for a vertically-sliding plate 34 to engage the end of the type-bar the inward movement of the locking-plate 30 is made to act with a direct thrust against the upper arm of the lever, as shown in Fig. 17, to produce the disengagement of the lever from the type-bar, the movement of the lever being controlled by a spring 106. When any one key 12 is depressed and the stop-plate 34 or the end of the lever 105 thereby elevated in manner as hereinbefore described, the type-bar is free to swing forward until it strikes the end of the depressed key. Hence the length of the movement permitted to the type-bar under the keys after any one of them is played will be determined by the position of the particular key, the depression of the lowermost or 9 key allowing the greatest movement, and that of the upper or 1 key the least movement.

Each segmental type-bar or type-carrier 41 bears upon its peripheral face type corresponding with the several numbers or characters designating each key in the group or row of keys under which it plays, said type being so arranged in consecutive order with reference to a printing device, to be hereinafter described, and to the keys controlling the movement of the bar, as that when the type-bar is at rest the 0 thereon shall be in line of print, and a forward or upward movement of the bar continued until it is arrested by the depression of key 1 will operate to bring type 1 to said line of print. Type 2 will thus be brought into line by the depression of key 2, and so on, the drawing Fig. 4 illustrating the type 3 as stopped in position for print by reason of the depression of the key 3.

The movement of the several segmental type-bars or type-carriers 41 is effected by means of the oscillation of the horizontal rock-shaft 42, mounted parallel with the shaft 15 in front thereof, and which is actuated by the handle 43. This rock-shaft 42 is so geared to each of the several type-bars as that, after either type-bar has been brought by the movement of the rock-shaft against the key, and thereby stopped, the movement of the rock-shaft may be continued independently until the handle actuating it has fully completed its stroke. This gearing is capable of yielding to permit the movement of one part independently of the other, and may consist of a segmental pinion 44 on the pivotal hub of each type-bar, (see Figs. 1 and 11,) an extended pinion 45 on the rock-shaft 42, (see Figs. 3, 11, and dotted lines, Fig. 1,) and an interposed compound rack-bar engaging both, (see Fig. 11,) or of a rubber band 107, as shown in Fig. 17, or of other equivalent devices which will suggest themselves to a skilled mechanic. The compound rack-bar to be used with the toothed gearing is constructed of a series of parallel bars 46 46, partially toothed to engage severally the segmental pinions 44 44 of the several type-bars 41 41, and which are severally mounted to have independent longitudinal play upon one side of a single wide bar 47, whose opposite side is partially toothed to form a rack engaging the pinion 45 on the rock-shaft 42. Each of the separate rack-bars 46 is guided in its longitudinal movement upon the supporting rack-bar 47 by means of a tongue 48 on the one fitting into a counterpart longitudinal recess in the other, and is held in position against the bar 47 and in parallelism therewith by means of horizontal rollers 50 50, mounted parallel with the shafts 15 and 42, to bear the one against the outer face of the lower end of the bar 47 on one side and the other against the opposite outer faces of the several bars 46 46 on the other, as shown in Fig. 11. An independent longitudinal movement of the bars 46 46 upon the bar 47 is prevented normally by the stress of a coiled spring 51, fitted within the longitudinal recess formed on the inner side of each bar 46, between the lower end wall 52 of said recess and the tongue 48, projecting therein from the opposite bar 47, as illustrated in Fig. 11. Both the wide pinion 45 and the rollers 50 50 are formed with encircling flanges 53. (See Figs. 11 and 12.)

The rack-bar and the type-carriers geared thereto are automatically depressed and the handle carried to its normal upright position by means of a spring 55, coiled upon the shaft 42, as shown in Fig. 3.

By means of the compound rack-bar 46 47 all of the type-carriers are simultaneously swung upward toward the front of the machine by a depression of the handle 43, while any one or more of them may be arrested by contact with one of the keys 12, in manner as hereinbefore described, at any point during said movement without interfering with a completion of the stroke of the handle and the further movement of the remaining type-carriers.

The power of each spring 51 is so proportioned as that its resistance will be sufficient to insure a positive movement of each type-bar 41 when actuated by a stroke of the handle, while it will be free to yield by compression when the type-carrier strikes a key, so as to permit the handle to continue its movement. A single depression of the handle will thus operate to move all the type-carriers, the handle being free to complete its stroke after the carriers are severally arrested by the previously-depressed keys. The arrest of each carrier serves to bring and hold the type appropriate to the key which produced the arrest in position for an impression therefrom upon a strip of paper by means of suitable printing mechanism.

The toothed yielding gear, as described, for actuating the type-carriers may be dispensed with by substituting as an equivalent yielding connection a heavy rubber band 107, (see Fig. 17,) carried at one end partially around the periphery of a hub 108, to which the radial arm of the appropriate segmental type-carrier is secured, and at the other partially around the periphery of a pulley 109 on the rock-shaft 42, the band being stiff enough to move the type-carrier until it is stopped and elastic enough to yield and permit a continuation of the movement of the rock-shaft independently of the type-carrier.

The printing mechanism consists of a paper-feeding device by which a strip of paper 56 (see Fig. 1) is carried over the faces of the several segmental type-bars 41 41 at a suitable point to receive an impression from the type brought thereon into line of print at that point, devices by which an inking-ribbon 57 is carried transversely over the paper at the line of print, a hammer or spring-actuated platen 58, which is made to strike the ribbon and paper against the type, and devices for producing automatically an action of the hammer at the moment the type are in line of print and for producing automatically a subsequent movement of the paper. The strip of paper 56, upon which the number or denomination of each key which may be depressed is recorded in proper order, is wound upon a detachable roller 59, mounted in suitable bearings 60 at the rear of the machine over the segmental type bars or carriers, as shown in Figs. 1 and 13, and is led thence over the face of suitable transverse guide-bar 61 and guide-plates 62 62, (see dotted lines, Fig. 1,) mounted across the segmental type-bar 41 immediately above and below a suitable line of print therefor, thence between a pair of parallel feed-rollers 63 63, mounted under said bars in the base of the machine, and is finally wound up upon a detachable take-up roller 64. The take-up roller 64 is geared to the feed-rollers by means of pulleys 65 upon the shafts of the respective rollers and a cord 66 carried over them. (See Fig. 13.) The bearings for the axial shaft of the inner feed-roller are formed in the ends of two oscillating arms 100 100, connected to move together and pivoted upon a fixed shaft 101, parallel with the feed-rollers and beneath them, and these arms are swung automatically toward the outer feed-roller, so as to bear the inner feed-roller into contact therewith with an elastic pressure by means of a spring 102, (see Figs. 1 and 14,) inserted under an arm 103, projecting radially from the axis of the united arms. The feed-rollers are geared together by pinions 67 67 at one end and are automatically actuated each time the rack-bar 47 is borne down by a movement of the handle 43 to set the type-bars through the medium of an arm 68, Figs. 1, 13, and 14, made fast to said rack-bar (see Fig. 1) to move with it, and which extends thence rearward to engage, by means of a lateral pin 69, a curved surface upon the upper free end of an arm 70, pivoted to oscillate upon the shaft of one of the feed-rollers 63 in proximity to a ratchet-wheel 73, secured upon the same shaft. (See Figs. 13 and 14.) This arm 70 is held in contact with the pin 69 by means of a spring 71. A pawl 72, pivoted thereto, drops into engagement with the ratchet-wheel 73. As the rack 47 descends, thereby causing the type-bars to move up into line of print, the arm 68, descending with it, causes the pin 69 to bear upon and slide over the curved end of the pawl-arm 70 in such manner as to oscillate said arm against the stress of its spring 71 far enough to move the ratchet-wheel 73, and with it the rollers 63 63, one step, and thereby feed the paper strip 56, forward far enough to bring a fresh space thereon in line of print. So soon as the rack-bar 47 and its arm 68 rise the stress of the spring 71 will carry back the pawl-arm 70, and with it the pawl 72, to its normal position, the pawl being thereby brought into engagement with a new tooth in readiness for the next move.

The automatic imprint of the strip of paper 56 from the type brought into line by a movement of the handle 43 in manner as described is obtained by means of the hammer 58, which is mounted upon the outer end of an elastic plate 75, Figs. 1 and 13, in position to strike against the type brought to the line of print. The plate 75 is secured at its lower end to a sleeve 76, revolving freely upon a stud pin or axle 77, made to project horizontally in front of the type-wheels parallel with their axial shaft 15 from a bracket 78 in the frame of the machine. This sleeve 76, oscillating upon the stud-axle 77, is actuated by a spring 79, bearing upon an arm 80, projecting from the sleeve, so that the hammer 58 will be normally held by the stress of said spring in close proximity to the face of the type on the type-carriers, being supported in this position by the contact of the arm 80 with a suitable stop 81. (See Fig. 1.) A latch 82 is pivoted to the outer free end of the arm 80 in such manner as that it will be rigidly supported in a right line with the arm by a contact of its rear end with an offset in the arm, as shown at $m$ in Fig. 1, so as to resist any upward stress or pressure thereon, but will be free to yield and swing downward when subjected to pressure from above, its normal position being maintained by means of a spring 83, bearing upward against its under side. The arm 80 is swung so as to retract the printing-hammer 58 from the type by means of a bent lever 84, pivoted upon an extension of the shaft carrying the inner guide-roller 50 of the compound rack-bar 46 47. The inner arm $r$ of said lever is extended to pass under the end of the latch 82, and its outer arm $t$ is extended to be engaged by a toe 85, projecting from the rock-shaft 42, actuated by the handle 43. This engagement occurs as the handle is completing its full downward stroke, and operates to move the lever far enough to cause its inner arm $r$ to lift the latch 82, and with it the arm 80. As the latch is thus lifted, the end of the lever will pass clear of it, leaving it free to return to its first position under the stress of the spring 79, while the lever-arm $t$ is permitted to pass back under the latch by the yielding or tripping of the latch under the downward pressure thereon of the arm as it returns. The printing-hammer 58 is thus made to strike the type in line of print and produce an impression therefrom upon the paper strip just as the actuating-handle 43 completes the stroke by which the type were brought into line of print. The outer arm $t$ of the bent lever 84 is also made, as it moves downward under the stress of the toe 85 thereon, to strike an arm 86, (see Fig. 1,) projecting from the rock-shaft 36, so as to produce an oscillation of said shaft, and thereby lift the pendent bars 33 33 of the locking-plates 30 30 and automatically release said plates from the depressed keys to permit them all to simultaneously resume their normal positions. The bent lever 84 is held in its normal position when at rest by a spring 87. (See Figs. 1 and 13.)

The locking-plates 30 may be moved to release the keys independently of a movement of the handle, when desired, by means of the hand-lever 37, extending outwardly from the rock-shaft 36, as shown in Fig. 1.

The inking-ribbon 57 is stretched in the customary manner between two rollers 88 88, Fig. 13, having sufficient friction in their bearings to hold it taut, and which are formed with milled flanges $s\,s$ to facilitate their rotation to move the ribbon.

The machine is provided with a series of adding-wheels 90 90 90, Figs. 3, 7, and 8, representing, respectively, units, tens, hundreds, and thousands, and which are geared together in the customary manner, so that each shall be moved one step at every complete revolution of the wheel next to the left thereof, yet admit of being revolved independently of said wheel on the left. These wheels are mounted to be read at the front of the machine and are severally actuated each by a toothed master-wheel 91, mediately geared to a pinion on the hub of each of said numbering-wheels 90, as shown in Figs. 7 and 8.

The several master-wheels 91 are all mounted to turn loosely upon an extension of the fixed shaft 15, upon which the type-bars 41 oscillate, (see Figs. 3, 9, and 10,) and are each engaged and actuated intermittently by a spring-actuated pawl 93, pivoted to a swinging arm 94, projecting from an annular disk or cam-wheel 95, (see Figs. 7, 8, and 15,) turning loosely upon the shaft 15 next to the right of each master-wheel. The swinging pawl-arms 94 are severally connected each by a rigid bar or rod 96 to the segmental type-carriers 41 and in regular order, (see Fig. 10,) so that the first type-carrier to the right, representing units, is coupled to the pawl-arm of the master-wheel which is geared to the first wheel to the right, or units-wheel, in the adding-train. The teeth of the master-wheels are adjusted and the gear so arranged as that each movement of the type-carrier operating to change the position thereof for the purpose of bringing a new type to the line of print will swing the pawl-arm 94 and pawl 93 back far enough to cause it upon its return to move the master-wheel, and consequently the adding-wheel, a proportionate distance. The pawls are retracted by the upward movement of the type-carriers each against the stress of a spring 99, and in their retraction slide freely over the teeth of the master-wheel. Upon their return they engage and actuate the master-wheels 91, and thereby move the adding-wheel, the power for moving the wheels being derived from the tension of the spring 99.

To prevent an independent movement of either of the adding-wheels out of its proper order—that is to say, a movement of any adding-wheel independently of that to the left of it—the spur-wheel 97, which meshes with the master-wheel 91 in the train of gear connecting each master-wheel, excepting only the last on the left, with its appropriate adding-wheel, is made wider than the master-wheel, and is automatically locked so soon as the spur-wheel on the left commences to move by a spring-actuated dog 98, (see Figs. 7, 8, and 9,) which is forced against the stress of its spring 119 into engagement with said spur-wheel 97 by means of a cam or projection on the periphery of the disk or cam-wheel 95, which carries the pawl actuating the wheel next to the left, the cam projection being so located and so proportioned as that the dog will remain locked thereby until the pawl has completed its stroke. (See Fig. 8.) Hence no one train of wheels can move until the wheels next to the left thereof have completed their movement.

Where the construction of the machine is so far modified as to permit the adding-wheels 90 to be brought into close proximity to the pawl-actuating master-wheel 91, so as to render the intervention of a spur-wheel 97 in the train unnecessary, each locking-dog actuated by a cam moving in unison with a master-wheel may be made to engage directly the master-wheel next to the right, as shown in Figs. 15 and 16. In such case the arm carrying the dog is actuated by a lever 120, projecting radially from its pivotal hub and bent at its outer end to bear against the periphery of the cam-disk 95, moving with the pawl-arm 94 of the pawl 93, actuating the master-wheel next to the left, the dog being adapted, when the cam projection is brought to bear upon said lever 120, to engage the teeth of the master-wheel on the right and lock it. The reverse movement of either wheel is prevented in the customary manner by a spring-actuated pawl 121. (See Fig. 15.)

In the operation of the complete machine, so soon as a cash payment has been received, the cashier will first depress one or more of the keys to designate the amount received—viz., a key in the first row for the units, in the second for the tens, in the third for the hundreds, and the fourth for the thousands. By depressing the appropriate keys (see, for example, key 3 in Fig. 4) the indicating-wheels 27 appropriate to each row in which a key is played will be turned by the movement of the indicator-plate 18, produced by the action thereon of the wedge-plate 19 on the key, so as to exhibit the number of said key in bold figures at the upper part of the case, thereby indicating the amount paid in. At the same time each depressed key will be caught and held in its depressed position by the movement of the locking-plate 30, while the rear end of said locking-plate will operate, in manner as described, to lift the stop 34, Fig. 4, or 105, Fig. 15, appropriate thereto, so as to free it from engagement with the front end of the appropriate type-bar 41, and its lower front end will be engaged and held by the dog A, (see Fig. 4,) so that a reverse movement of the indicating-wheel will be prevented until the amount indicated shall have been recorded and added. The amount paid in having thus been properly indicated by the play of the keys, and the type-carrier for said keys left free, a downward stroke of the handle 43 will operate, by means of the compound rack-bars 46 47 and intervening pinions (see Figs. 1 and 11) or the rubber band 107, (see Fig. 17,) as an equivalent to swing upward or forward all of the type-carriers. During this movement the forward end of each type-carrier or of the rod projecting therefrom will strike against the end of the depressed key in the row or group under which the bar moves, and the further movement of the carrier will be thereby arrested with the particular type corresponding to the depressed key in line of print under the printing-hammer 58. Thus the several type appropriate to the several depressed keys and to the numbers represented on the indicating-wheels will be brought in position for imprint on the strip of paper 56, interposed between the hammer and type. The strip of paper is in the meantime fed forward by the movement of the feed-rollers 63, produced by the action of the arm 68, attached to the rack-bar 47, and whose depression with the rack-bar causes the oscillation of the pawl-arm 70 and pawl 72 to actuate the ratchet-wheel 73 on the shaft of the feed-roller. So soon as the type-carriers are brought into proper position for the imprint the continued movement of the handle 43, in completing its downward stroke, will cause the toe 85 on the axial shaft of the handle to strike the end of the bent lever 84, and by moving said lever produce a retraction and release of the printing-hammer 58, so that it will strike upon the paper strip and inking-ribbon and force them against the type, so as to produce a clear impression thereof upon the paper. The downward movement of the arm $t$ of the lever 84, as it operates to actuate the printing-hammer, will also operate to move the key-locking strips 30 30 by striking the arm 86 on the rock-shaft 36, so as to oscillate said shaft, and this movement of the locking-strips will release all the depressed keys and permit them to resume their normal positions. In the meantime the movement of each type-carrier will have operated, by means of the connecting-rod 96, to draw back the pawl 93, actuating the train of gear-wheels for moving the adding-wheel appropriate to the denomination represented by said type-carrier, whether units, tens, hundreds, or thousands, the distance to which the pawl is retracted being so proportioned to the movement of the type-carrier as that upon the return of the pawl it will move the adding-wheel a proper distance to cause it to register the number upon the type-carrier which was brought to line of print, the independent movements of the adding-wheels out of their proper order being severally prevented by the spring-actuated dogs 98 98, each controlled by the movement of the pawl actuating the adding-wheel of next higher order. As the handle begins its stroke, the toe K upon its hub (see Fig. 4) will be carried against the lever F to move it, and this movement will operate to free for an instant the dog A from the teeth on the indicator-plate 18, thereby freeing the plate from the position to which it was last carried when the next preceding payment was registered and allowing it and the indicating-wheel which it actuates to move to the position permitted by the last play of a key. Thus after the amount paid in has been indicated by a depression of the proper keys it will, by a downstroke of the handle, be imprinted upon a continuous strip of paper and the sum thereof added to the sum of the preceding payments previously registered by the adding-wheels. The depressed keys will then, as the handle completes its movement, be automatically released, the indicating-wheels remaining, however, in position to indicate the last amount paid and registered until the handle is again moved after another payment, the return of the handle to its normal position being at all times automatically effected by the action of its spring 15.

It is evident that by combining with the machine known devices for cutting and delivering the same the strip may be used to furnish printed checks instead of being retained in the machine as a printed record. It is also evident that the segmental type-carriers, as described, may be used as a substitute for indicating-wheels in the machine by bringing to an opening and there displaying characters corresponding to the key played, either as auxiliary to a corresponding set to be used in combination with printing devices or independently where a printed record or printed checks are not required.

I do not here claim the combination of the cam, pawl, and dog locking the next adding-wheel nor the other features of the adding apparatus shown.

I do not claim as my invention the combination, with the series of type-carriers, of a series of movable keys for each type-carrier to define the movements of the latter, an operating-shaft to move the carriers, and a yielding connection between each carrier and the shaft.

I claim as my invention—

1. The combination of a movable type-carrier, a series of movable stops or keys to arrest the type-carrier in different positions, an independent rock-shaft to actuate it, and elastically-yielding gear transmitting the movement of the rock-shaft to the carrier, substantially in the manner and for the purpose herein set forth.

2. The combination of the segmental oscillating type-carrier carrying a toothed segment, a rack-bar geared to said toothed segment, an auxiliary parallel rack-bar moving longitudinally in ways formed in the first, an interposed spring, a rock-shaft actuated by a suitable handle, a pinion upon said shaft geared to the auxiliary rack-bar, and movable keys mounted to traverse the path of the type-carrier, substantially in the manner and for the purpose herein set forth.

3. The combination, in a registering device, of the series of movable keys, an indicating device and connections for moving it by the action of the keys, and a type-carrier movable in a path across that of the keys, substantially as set forth.

4. The combination, with the series of indicators, of a series of rows of keys 12, a plate 18 to each row connected to one of the indicators, the keys having bearings upon the plate arranged to vary the movements of the plate according to the positions of the keys, substantially as set forth.

5. The combination of the movable keys, indicators, plates 18, connected with said indicators, and a detent A for each plate, substantially as set forth.

6. The combination of the series of keys, series of indicator-plates, series of detents A, and a device arranged to simultaneously move all the detents, substantially as set forth.

7. The combination, with the movable keys and movable plates 18, of rotating indicators 27 and connections between the same and the plates, substantially as set forth.

8. The combination of an indicating device and a series of radially-movable keys and connections for moving said device from said keys, and a type-carrier movable across the lines of movements of said keys in position to make contact with any key that is depressed, substantially as set forth.

9. The combination of a series of movable radial keys, graduated wedges carried by said keys, and an indicating device and connections between the latter and said wedges, whereby the extent of movement of the indicating device varies according to the key moved, substantially as and for the purpose herein set forth.

10. The combination of a series of movable radiating keys, graduated wedges carried by said keys, an indicating device actuated mediately by either wedge when its key is depressed, and a locking-plate mounted to intersect and automatically engage each depressed key, substantially in the manner and for the purpose herein set forth.

11. The combination of a series of spring-actuated radial keys, a locking-plate mounted to intersect and automatically engage each depressed key, a type-carrier movable across the line of said keys, a stop moving automatically into engagement with the type-carrier to prevent its oscillation, and means, substantially as described, whereby the movement of the locking-plate is made to move said stop and release the carrier, substantially in the manner and for the purpose herein set forth.

12. The combination, with the series of radially-movable keys and indicators and intermediate actuating devices, of a series of oscillating type-carriers arranged to traverse across the lines of the keys and make contact with the depressed keys, the figures on the indicators and on the type-carriers being arranged to correspond when both parts are set by the action of the keys, substantially as set forth.

13. The combination of an oscillating type-carrier, a series of spring-actuated keys radiating from the axis of said carrier to traverse when depressed its line of movement and bearing differential wedges, a longitudinally-sliding spring-actuated indicator-plate curved upon an arc described about the same axis and mounted to intersect said keys and be actuated by the wedges thereon, an indicating-wheel geared to said plate, a pivoted dog automatically engaging teeth on the outer end of the plate to prevent its return when moved inward, a rock-shaft, a toe upon said rock-shaft, and a pivoted bent lever actuated by the toe when the shaft is oscillated to move the dog and release it momentarily from the indicator-plate, substantially in the manner and for the purpose herein set forth.

14. The combination, with the oscillating type-carrier, the radial keys carrying differential wedges and traversing its path, and the spring-actuated indicator-plate mounted to intersect said keys and be actuated by the wedges thereon against the stress of the spring as the keys are pushed inward, of a pivoted lever coupled at its shorter end to one end of said curved plate and terminating at its longer end in a segmental rack, a pinion geared to said rack, and an indicating-wheel actuated by said pinion, whereby the movements of the several keys are made to produce differential movements of the indicating-wheel, substantially in the manner and for the purpose herein set forth.

15. The combination, with the segmental oscillating type-carrier, the series of spring-actuated radial keys carrying differential wedges and made to traverse the line of movement of the type-carrier, an indicating-plate and indicator actuated by said wedges in the movement of the keys, a locking-plate automatically engaging the keys to lock them when depressed, a rock-shaft actuating the type-carrier and having a radial arm actuating the locking-plate to produce a release of the keys when the carrier is moved, and means, substantially as described, for actuating said rock-shaft, all substantially in the manner and for the purpose herein set forth.

In testimony whereof I have signed my name to this specification in the presence of two subscribing witnesses.

WILLIAM KOCH.

Witnesses:
  A. N. JESBERA,
  E. M. WATSON.